Patented July 12, 1938

2,123,192

UNITED STATES PATENT OFFICE 2,123,192

METHOD OF MAKING INSECTICIDE

John F. Les Veaux, Middleport, N. Y., assignor to Niagara Sprayer and Chemical Co., Inc., Middleport, N. Y., a corporation No Drawing. Application June 4, 1936,
Serial No. 83,556

9 Claims. (Cl. 23—53)

This invention relates to insecticides containing insoluble arsenates of substantially non-toxic metals such as calcium and magnesium and more particularly to improved methods of making same.

In my co-pending application Serial Number 14,529, I have described and claimed an arsenical insecticide of the class specified which is substantially free from phytocidal substances, i. e. substances which are injurious to an objectionable degree to living plant organisms such as apple trees, peach trees and other trees or plants which are injured by these phytocidal substances when materials containing them are applied to these plants in the usual manner for controlling the insect pests thereon, as for instance in the manner and in accordance with the usual practice in applying lead arsenate to such plants.

It is well known that lead arsenate is substantially non-injurious to sensitive plants such as those mentioned above but the lead contained in this material is objectionable because of its toxic character which is cumulative in the human organism when the residues normally left on the fruits or other edible portions of the plant (except when washed by special methods) are taken into the human system as food. In recent years very low tolerances limiting the amount of lead upon fruits, vegetables, etc., have been promulgated by authorized government officials, both Federal and State, for this reason, so that it is highly desirable that an arsenical insecticide be provided which is substantially free from lead or other similar toxic metal and yet which is substantially as effective as lead arsenate for use as an insecticide on fruits and other edible portions of plants generally of the class which ordinarily require the use of arsenical insecticides in order to efficiently control certain insect pests to which they are normally subject.

Furthermore, it is well known that the lead in the lead arsenate residues normally remaining on the fruits, etc., is frequently difficult to remove even by special washing methods referred to above so that it is equally desirable that an arsenical insecticide be provided, the normal residues of which can be more readily and conveniently removed from the fruits, etc., than is possible with lead arsenate.

I am aware that ordinary commercial calcium arsenate and magnesium arsenate have been proposed as substitutes for lead arsenate in order to avoid the toxic effects of lead and the lead residue problem referred to above, but these substitutes for lead arsenate have proved far from satisfactory mainly for the reason that they have been found to be injurious to the trees or plants to a very objectionable degree. I am also aware that various so-called safening agents have been proposed, to be added to the calcium arsenate or magnesium arsenate to render them less injurious to the trees or plants but these procedures likewise have not overcome the difficulties mentioned above to any satisfactory extent, if at all, or else the resulting materials have not possessed the necessary insecticidal value or toxicity toward the insect pests.

The product described and claimed in my co-pending application, Serial Number 14,529, effectively meets the requirements outlined above and also completely or at least very largely overcomes the objections just mentioned in connection with prior attempts to meet these requirements, by providing an insecticide containing an arsenate of a non-toxic metal, preferably an arsenate of calcium, which is substantially free from phytocidal substances, is substantially non-injurious to trees, fruits and plants, is highly toxic toward insect pests and which possesses a resistance toward the decomposing action of carbon dioxide solution or carbonic acid substantially greater than that of the substantially insoluble reaction product obtained by bringing lime or other soluble calcium compounds into intimate contact with arsenic acid or a soluble arsenate and water at ordinary or elevated temperatures and separating the insoluble reaction product from the water.

In my aforesaid co-pending application I have also described and claimed certain methods of making the improved arsenical insecticide referred to above which methods comprise first preparing an insoluble arsenate of a non-toxic metal such as calcium or magnesium or admixtures thereof by first bringing a soluble compound of the non-toxic metal into intimate contact with arsenic acid or a soluble arsenate and water at ordinary or elevated temperatures and separating the insoluble or precipitated reaction product from the water and then heating the substantially dry product thus obtained at a temperature above about 1100° F. until it is substantially freed from phytocidal impurities and discontinuing the heating before the material becomes substantially non-toxic to insect pests commonly controlled by means of lead arsenate.

One of the principal objects of the present invention is to provide improved methods of making the improved arsenical insecticides referred to above and more particularly the improved calcium arsenate having the highly desirable properties already described.

A further object of the present invention is to provide such improved methods which avoid the necessity of employing arsenic acid or a soluble arsenate.

A third object of the present invention is to provide such improved methods which comprise the controlled heat treatment of the substantially dry arsenates during and after their formation by known methods from their corresponding arsenites by exothermic reaction with gaseous oxygen, such controlled heat treatment comprising the removal of a certain portion of the heat produced by the said exothermic reaction as the arsenates are being formed from the arsenites as well as thereafter and the regulation of the temperature and time of said heat treatment between certain limits so as to produce the improved arsenical products having the improved properties referred to above and described in greater detail in my co-pending application.

The principal advantages of the improved methods of the present invention over those described in my co-pending application comprise a saving in the heat required for the heat treatment of the arsenates and for the evaporation of the large amount of water ordinarily required in their formation by the chemical interaction of arsenic acid or soluble arsenates with solutions or suspensions of the compounds of the corresponding metals (such as calcium or magnesium oxides or their soluble salts). Many other advantages of the present methods will be obvious to those skilled in the art to which the present invention relates, among which mention may be made of the utilization of gaseous oxygen instead of the more expensive nitric acid for the formation of the arsenates from arsenious compounds such as arsenious acid or arsenites.

I am aware that calcium arsenates, magnesium arsenates and the like have hitherto been prepared by the exothermic oxidation of their corresponding arsenites by means of gaseous oxygen but these older methods do not produce the improved product to which the methods of the present invention are specifically directed but on the contrary result in the formation of products which are either inert or substantially non-toxic toward the insect pests normally occurring on tender plants or else contain substantial and objectionable quantities of phytocidal impurities which result in substantial injury to such plants when applied to the same for controlling the said insect pests.

In the practice of my invention I prefer to proceed in accordance with the following example:

*Example I.*—I first prepare a basic arsenite of calcium in the following manner: 300 pounds of granulated or pulverized quick lime is added gradually to 50 gallons of water contained in a suitable mixer such as a dough mixer with agitation. 1188 pounds of white arsenic is then added gradually to the mixture of lime and water during a period of from about 15 to 20 minutes. The heat of reaction between the arsenic and the lime heats up the mixture quite rapidly without the application of external heat and in fact the heating is so rapid that it is advisable in order to prevent complete evaporation of the water at this stage to add, during this 15 or 20 minute interval, an additional 450 gallons of water to the mixture in small portions at such intervals as to prevent objectionably violent boiling of the mixture. To the mixture thus produced is now gradually added with stirring during a period of 15 to 20 minutes an additional amount of pulverized quick lime amounting to about 1482 pounds. After the addition of this lime the agitation of the mixture is continued for about 10 minutes longer and the still hot moist batch is transferred to a suitable dryer to remove the remaining small percentage of moisture present.

The basic arsenite of calcium produced by the foregoing procedure is next ground or pulverized to a degree of fineness so that substantially all of it will pass a standard wire screen having about 12 meshes per inch and substantially all will be retained on a standard wire screen having 100 meshes per inch.

The pulverized calcium arsenite is now gradually fed into an inclined rotary refractory lined kiln internally fired by means of a gas or oil flame. This kiln is preferably of the type usually employed for the calcination of cement or lime. The mixture of hot air and combustion gases from the flame is caused to pass counter currentwise to the direction of flow of the pulverized calcium arsenite as it traverses the inclined kiln. The air supply and combustion gases are proportioned in such a manner as to always maintain in the furnace an oxidizing atmosphere around the particles of the calcium arsenite. Before feeding the pulverized calcium arsenite into the kiln the temperature of the oxidizing gases passing through the furnace is gradually brought up to a temperature of 1650° F. and maintained at this temperature for one or two hours or until all parts of the furnace have come into thermal equilibrium with the gases. The feeding of the pulverized calcium arsenite into the hot furnace is then started and the rate of feeding, the air supply and flame adjusted in such a manner as to maintain the temperature of the gases in the lower or oxidizing zone of the furnace immediately surrounding the particles of the pulverized material between about 1600° F. and 1700° F. The total time of travel of the calcium arsenite through the furnace should be about one hour of which time about ½ hour or thirty minutes should be allowed for heating the calcium arsenite up to its ignition temperature and for completion of the oxidization of the calcium arsenite to calcium arsenate. The ignition temperature of the calcium arsenite is about 900° F. and the oxidization of the calcium arsenite to calcium arsenate is substantially completed in a very few minutes after the calcium arsenite reaches this ignition temperature.

It will be observed that as a consequence of the foregoing procedure the pulverized calcium arsenite is gradually heated up as it travels through the furnace from its original temperature, which may be ordinary atmospheric temperature or above, first up to its ignition temperature or the temperature at which the exothermic chemical reaction takes place and that thereafter by adjustment of the rate of loss of the exothermic heat to the hot gases and through the furnace walls to the outside atmosphere, the temperature of the pulverized material is allowed to increase until the oxidizing gases immediately surrounding the particles and therefore the approximate temperature of the particles themselves (if not too large) reaches a temperature of between about 1600° F. and about 1700° F. and is maintained by suitable adjustment or proportioning of the rate of external heating to the rate of heat loss or removal, at about this temperature for a period of about ½ hour after which it is discharged from the furnace and allowed to cool.

However, it will be understood, of course, that my invention is not restricted to the specific temperature and time of treatment of the calcium arsenite nor to the other conditions specified in the foregoing example nor to the particular compositions of the materials specified but that various changes may be made with respect thereto without departing from the true scope of my invention as set forth in the appended claims. Thus, for example, the temperature of the pulverized material in the oxidizing zone (which is the temperature which has the greatest effect on the elimination of phytocidal substances from the finished product) may be varied between about 1100° F. and about 2200° F. but I have found that below about 1100° F. this elimination of phytocidal substances, or in other words the safening action on the material is not substantial and that above 2200° F. the product loses, in a very short time, substantially all of its toxicity toward insect pests and becomes practically inert for this purpose. Likewise the time during which the pulverized material is maintained at the elevated temperatures in the oxidizing zone may be varied widely, depending mainly upon the particular temperature chosen, this time varying in an inverse manner with the temperature. Thus at 1500° F. the time required for producing a satisfactory product for the purposes of my invention is from three to eight hours while at 1800° F. this time is only about ten or fifteen minutes.

In carrying out my invention it is extremely important that there be always an excess of air or oxygen about each particle of the pulverized material from the time it reaches its ignition temperature which is about 900° F. until the heat treatment is completed. The oxidation of the calcium arsenite takes place so quickly with the rapid liberation of heat from the exothermic reaction and the arsenic is so readily lost in the absence of oxygen at temperatures above this ignition temperature that these oxidizing conditions must be fulfilled in order to obtain best results. Also in order to maintain this oxidizing condition around the particles it is necessary that the pulverized material be rapidly stirred or turned over in intimate contact with an excess of gaseous oxygen and I have found that the rotary type of furnace is preferable for this purpose. It is also quite important in carrying out my invention that the particles of the pulverized calcium arsenite shall be relatively small and that balling up or agglomeration be prevented during their oxidation since the particles of the pulverized material are extremely poor heat conductors and quite permeable to oxygen so that if these particles are larger than about one inch in diameter the oxidation proceeds so fast and the exothermic heat is dissipated so slowly from the particles that a substantial portion of the particles particularly at their interior appear to become molten or plastic and after cooling acquire a high degree of hardness so that when pressed between the fingers they seem to have a gritty or sandy property. These hard or gritty grains of material are practically inert when used as an insecticide and are therefore of no substantial value for the purposes of my invention. This hardening effect is also observed to a lesser degree when the pulverized calcium arsenite contains any substantial proportion of particles larger than about ½ inch in diameter. Ordinarily therefore I prefer that the calcium arsenite employed in carrying out my invention shall not contain substantial proportions of particles larger than about ½ inch in diameter. On the other hand I have found that when the pulverized calcium arsenite contains any substantial proportion of relatively fine particles or dust, an objectionable amount of material is lost in the form of a fine dust in the furnace during the oxidation of the calcium arsenite or the subsequent heat treatment of the resulting calcium arsenate.

It will be understood also that my invention is not restricted to the particular method of making calcium arsenite described in the above example although this is the preferred method, but I may vary the relative proportions of lime and white arsenic within wide limits without departing from my invention. Thus instead of using the proportions specified which correspond approximately to a composition containing normal calcium arsenite and about 32 percent excess of lime, I may use such proportions of lime and white arsenic as are required to produce either normal calcium arsenite or an intimate mixture of normal calcium arsenite and varying proportions of excess lime. I have found, however, that if I use in my process proportions of white arsenic which are substantially greater than the proportions corresponding to normal calcium arsenite some of the white arsenic is lost by volatilization when the resulting composition is oxidized in the furnace in accordance with the later steps in my improved method and I therefore prefer to employ compositions in which the percentage of lime to white arsenic is not substantially less than that corresponding to normal calcium arsenite.

Also in making the calcium arsenite composition I have found it advantageous to add the white arsenic to a suspension or solution of the lime containing only a portion of the total lime desired in the calcium arsenite composition, adding the remainder of the lime after the addition of the total amount of white arsenic for the reason that if the white arsenic is added to the total amount of lime dissolved or suspended in the water the lime reacts with the particles of white arsenic as they enter the mixture forming very insoluble basic calcium arsenite which occludes or encloses a portion of the white arsenic which remains uncombined with the lime and thus may be lost in the later stages of the process. On the other hand, I have found that if the white arsenic is added to the water first and the lime added later the white arsenic wets very poorly and tends to form objectionable amounts of dust during the wet mixing step and also sticks badly to inaccessible parts of the mixer.

I have also found that it is highly advantageous in carrying out the method of the present invention to intimately mix in any suitable manner varying proportions of ordinary calcium arsenate (either calcined or uncalcined) with the calcium arsenite or calcium arsenite and lime composition before subjecting the calcium arsenite and the resulting calcium arsenate to the heat treatment in accordance with the previously described procedure of the present invention. I have found that the admixed untreated calcium arsenate has the desirable effect of absorbing a substantial portion of the exothermic heat liberated during the oxidation step of the present method. In this manner the excessive heat treatment of the calcium arsenate is more readily avoided than in the absence of the added or admixed calcium arsenate. For this purpose I prefer to employ intimate admixtures of calcium arsenite and added calcium arsenate containing between about 15 and 40 percent of the total arsenic present in the form of added calcium arsenate in a mixture calculated to make a total of 70 percent tricalcium arsenate in the finished product.

In determining the point at which the heating of the calcium arsenite and resulting calcium arsenate should be discontinued in order to obtain a product having a satisfactory safety toward plants or at which it becomes substantially free from phytocidal substances and yet at the same time possesses the required degree of toxicity toward insect pests, I test its resistance toward the decomposing action of carbon dioxide solution or carbonic acid and discontinue the heating when this resistance reaches a certain value or comes within a certain range of values as determined by the following carbonation test:—

Carbonated water is made by bubbling carbon dioxide through distilled water in a series of 5 or 6 flasks kept in a cold water bath for 24 hours or less. The flasks are emptied into one large bottle and agitated to make a uniform solution and the concentration of carbon dioxide is determined in the following manner:

Pipette 50 cc. of approximately N/10 $Ba(OH)_2$ (made by dissolving 16 grams $Ba(OH)_2.8H_2O$ in one liter distilled water) into each of two beakers. Pipette 50 cc. of the carbonated water into one of the beakers. Add three drops phenolphthalein to each beaker and titrate both beakers with standard N/10 HCl to the point where the pink color of the solution disappears.

The difference in the titrations is equivalent to the concentration of $CO_2$. The concentration is usually from .8 to 1.6 g. $CO_2$ per liter.

The carbonation test itself is made as follows:
Five bottles of about 800 cc. capacity are used. To the first is added 650 cc. distilled water, to the second 550 cc., to the third, 450 cc., etc. To each bottle is then added 1.5 grams of the calcium arsenate in question. Then to number one is added 100 cc. of the carbonated water, to number two is added 200 cc. etc., giving a series containing 1.5 grams calcium arsenate in various concentrations of carbon dioxide.

The five bottles are tightly stoppered and put in a tumbling machine running about 50 R. P. M. and thus turned alternately bottoms up and down for 30 minutes to insure exposure of all particles of the sample to the carbonic acid. The temperature during this procedure is held at about 65 degrees Fahrenheit.

The solutions are then filtered and 500 cc. of the filtrate treated with 3 cc. of concentrated sulphuric acid and boiled down in a liter Erlenmeyer flask to about 100 cc. volume, three grams of potassium iodide are added and the evaporation continued to 50 cc. volume.

The cooled solution is made to 300 cc. with distilled water, titrated to colorless point with N/10 sodium thio sulphate solution, neutralized with bicarbonate adding 5 grams in excess, a few drops of starch solution added and titrated with N/20 iodine.

It is observed that the above carbonation method is substantially the same (except for the use of a solution of carbonic acid) as the method for determining water soluble arsenic in calcium arsenate described in the book entitled "Official and Tentative Methods of Analysis of the Association of Official Agricultural Chemists", second edition, published by the said association, pages 50 and 51. From the data obtained in this manner the amount of soluble arsenic in each bottle is calculated and expressed as metallic arsenic.

When ordinary commercial (wet-precipitated) calcium arsenate, prepared by the first step described in the specific example of my invention given above, is tested in the manner just described, the results on the average are approximately as given in the following table:

*Table I*

| Grams $CO_2$/750 cc. | Percent soluble arsenic |
|---|---|
| 0.171 | 4.64 |
| 0.342 | 7.49 |
| 0.513 | 10.73 |
| 0.684 | 12.94 |
| 0.855 | 14.51 |

These results also approximate those obtained with calcium arsenate prepared in accordance with the prior art as described in the U. S. patents hereinbefore mentioned.

In calculating the percent of soluble arsenic formed by the carbonic acid it will be understood that a correction must be made for the soluble arsenic already present in the untreated arsenate.

In the practice of my invention, I continue the heat treatment of the calcium arsenite-calcium arsenate mixture as described above until a representative sample weighing about 1½ grams when subjected to the carbonation test described above reacts with the carbon dioxide to form an amount of soluble arsenic which is substantially less than that shown in Table I above for each of the amounts of carbon dioxide per 750 cc. shown in the table and particularly for the higher amounts of carbon dioxide, but I prefer to continue the heat treatment of the calcium arsenite and resulting calcium arsenate, in the case where the pulverized material being treated contains about 26 percent excess lime over and above that corresponding to normal calcium arsenite or arsenate, until a representative sample of the product thus obtained, weighing about 1.5 grams, when brought into intimate contact with about ¼ gram of carbon dioxide dissolved in about 750 cc. of water at a temperature of about 65 degrees Fahrenheit for about 30 minutes with stirring reacts with the carbon dioxide and water to form an amount of soluble arsenic, expressed as metallic arsenic, not more than about 2 per cent of the weight of the sample.

When I calcine or heat-treat material containing more or less than about 26 percent excess lime, in accordance with the method of this invention, I prefer to continue the heat-treatment under any given set of conditions until a sample of the product thus produced, weighing about 1.5 grams, when brought into intimate contact with an amount of carbon dioxide dissolved in 750 cc. of water which is substantially equivalent to the excess lime, at a temperature of about 65° F., for about 30 minutes, with stirring, reacts with the carbon dioxide solution to form an amount of soluble arsenic, expressed as metalic arsenic, which is not more than about 2 percent of the weight of the sample.

I have also found that when the resistance of the heat-treated or calcined calcium arsenate, prepared from the arsenite as outlined above and containing about 26 to 32 percent excess lime, toward the decomposing action of carbonic acid is such that the amount of soluble arsenic formed from 1.5 grams of the material as determined by the above test when 2 grams of $CO_2$ per 750 cc. of water is used in place of the equivalent amount of $CO_2$ mentioned above, is less than about ½ percent, the resulting product does not possess a satisfactory toxicity toward insect pests such as those commonly controlled by means of lead arsenate or magnesium arsenate, etc.

It will be observed that the 2 grams of $CO_2$ referred to above is considerably in excess of that amount which is substantially equivalent to the excess lime contained in the 1.5 grams sample of the material, the purpose of using this excess $CO_2$ being to subject the material to a more vigorous carbonation action in order to determine the point at which the material becomes substantially inert or non-toxic for controlling insect pests by the methods commonly used for this purpose.

On the other hand I have found that when the resistance of the calcined or heat-treated calcium arsenate (containing excess lime) toward the decomposing action of carbonic acid is such that the amount of soluble arsenic formed as determined by the above test (using an amount of carbonic acid substantially equivalent to the excess lime) is more than about 2 percent, the resulting product is objectionably injurious to the plants, or, in other words, is not substantially free from phytocidal substances.

It will be understood, however, that in general, advantageous results are obtained if the heating or calcining of the calcium arsenate or magnesium arsenate or other similar insoluble arsenates of non-toxic divalent metals (whether containing excess lime or not) is continued until their safety toward plants is substantially increased provided the heating is discontinued before the material becomes inert or substantially non-toxic toward insect pests, and it will be understood that this general procedure and method constitutes an important aspect or feature of my invention.

After the calcium arsenate is calcined or heated in accordance with my invention as described above I have found it advantageous to hydrate the calcined material, after cooling, in any convenient manner, preferably by feeding granular or powdered material into a current of steam and separating the powdered material from the steam after the excess calcined lime contained in the material has been hydrated to calcium hydrate. This method of hydration may conveniently be carried out by means of the so-called steam mill or steam pulverizer in which the current of heated steam carrying the suspended granular material impinges against the hard metal surface in such manner that the suspended granular material is further pulverized or broken up into a powder and emerges from the mill in a substantially dry state. It is advantageous also to mix a small amount of a deflocculating agent such as casein with the calcined calcium arsenate before carrying out this hydration step to prevent agglomeration of the particles. It will be understood, however, that this rehydration and fine grinding operation may be carried out in any convenient manner which will result in the hydration of the quicklime or calcium oxide formed during the calcination step of my process and the breaking up of the agglomerated particles.

The main advantage of this hydration and deflocculating operation is that it further increases the toxicity of the calcined calcium arsenate and also improves the physical properties of the finished product.

It will also be understood that my invention is not limited or restricted to the particular type of calcining furnace described in the specific example described above, but that any other suitable or convenient type of calcining furnace may be used such as a shelf type calcining furnace or Herreschoff type of furnace and the like.

The remarkable resistance of the improved calcium arsenate of the present invention toward the action of carbon dioxide is well illustrated by the data shown in Table II below. This data was obtained by testing a sample of well safened calcium arsenate which had been calcined or heat-treated in accordance with the present invention by the carbonation test hereinbefore described.

*Table II*

| Grams $CO_2$/750 cc. | Percent soluble arsenic |
| --- | --- |
| .171 | .08 |
| .342 | .22 |
| .513 | .45 |
| .684 | 1.18 |
| .855 | 1.96 |

It will be observed that if the different percentages of soluble arsenic shown in Table II be plotted on the ordinate axis against the corresponding grams of carbon dioxide on the abscissa axis on cross section paper and a smooth curve drawn through the different points thus obtained in the usual manner of plotting a curve to represent graphically the variation of one variable quantity with another on which its value depends, the curve thus obtained is convex to the abscissa at all points and I have discovered that this relationship between the different percentages of soluble arsenic and the different corresponding amounts of carbon dioxide used in the above described carbonation test is characteristic of calcium arsenate which has been safened or freed from phytocidal substances by the heat treatment of the substantially dry arsenical material in accordance with my invention, whereas in the case of calcium arsenate which has not been thus heat-treated, the carbonation curve plotted in the manner described above is convex to the abscissa only from the foot of the curve to the ordinate which corresponds to the amount of carbon dioxide (usually about ¼ gram) which is substantially equivalent to the excess of calcium oxide (usually about 26 percent) in the 1.5 gram sample of the calcium arsenate material, the remainder of the curve from this point on being concave to the abscissa, the entire curve resembling a crude letter S.

On the other hand if the calcium arsenate material is heat-treated in the dry state to an excessive degree so that the product becomes substantially inert or non-toxic to insect pests as previously explained then the carbonation curve described above is only very slightly or imperceptably convex to the abscissa.

In connection with the above discussion of the different forms of carbonation curves it will be obvious that those portions of such curves which are convex toward the abscissa correspond to a continuous increase in the percentage of soluble arsenic produced by each constant or unit increment in the amount of carbon dioxide (i. e. the slope of this convex portion of the curve increases continuously) and that those portions of the curves which are concave toward the abscissa correspond to a continuous decrease in the percentage of soluble arsenic produced by each constant or unit increment in the amount of carbon dioxide (i. e. the slope of this concave portion of the curve decreases continuously).

It will thus be observed that my improved arsenical product is characterized in part at least by a definite relationship between the different amounts of soluble arsenic formed by the action of different amounts of carbon dioxide on the material throughout a very wide range of proportions of carbon dioxide to the arsenical product.

In making the carbonation test the particle size of the calcined or heat-treated material should correspond to 70% to 90% through a 300 mesh screen determined as follows: A ten gram sample is stirred into 200 cc. of water and poured onto a previously wetted screen. The screen is washed free of smaller than 300 mesh particles by a gentle stream from a tap, the residue flushed into a beaker, washed into a tared gooch, dried and weighed. If the particle size is larger than that specified above, the results of the carbonation test will be low and if smaller the results will be somewhat higher than normal.

I claim:

1. In the method of making insecticidal calcium arsenate for controlling the normally occuring insect pests on relatively tender growing plants, the steps which comprise heating pulverized calcium arsenite in an atmosphere containing gaseous oxygen to a temperature sufficient to bring about the exothermal chemical reaction of the oxygen with the calcium arsenite to form calcium arsenate, maintaining the particles of the calcium arsenite during and after said reaction in intimate contact with a surrounding oxidizing atmosphere at a temperature between about 1100° F. and about 2200° F. by removal of a portion of the exothermal heat produced by said interaction until the resistance of the particles of the calcium arsenate thus formed toward the decomposing action of carbon dioxide solution or carbonic acid is such that a representative sample of the product thus obtained, weighing about 1½ grams, when brought into intimate contact with about ¼ gram of carbon dioxide dissolved in about 750 cc. of water at a temperature of about 65° F. for about 30 minutes with stirring reacts with the carbon dioxide and water to form an amount of soluble arsenic, expressed as metallic arsenic, not more than about 2% of the weight of the sample, and said resistance to the decomposing action of the carbon dioxide solution is such that a second representative sample weighing about 1.5 grams, when brought into intimate contact with about 2 grams of carbon dioxide dissolved in about 750 cc. of water at a temperature of about 65° F. for about 30 minutes with stirring reacts with the carbon dioxide and water to form an amount of soluble arsenic, expressed as metallic arsenic, not less than about ½% of the weight of the sample.

2. In the method of making insecticidal calcium arsenate for controlling the normally occuring insect pests on relatively tender growing plants, the steps which comprise heating pulverized calcium arsenite in an atmosphere containing gaseous oxygen to a temperature sufficient to bring about the exothermal chemical reaction of the oxygen with the calcium arsenite to form calcium arsenate, maintaining the particles of the calcium arsenite during and after said reaction in intimate contact with a surrounding oxidizing atmosphere at a temperature between about 1100° F. and about 2200° F. by removal of a portion of the exothermal heat produced by said interaction until the resistance of the particles of the calcium arsenate thus formed toward the decomposing action of carbon dioxide solution or carbonic acid is such that a representative sample of the product thus obtained, weighing about 1½ grams, when brought into intimate contact with about ¼ gram of carbon dioxide dissolved in about 750 cc. of water at a temperature of about 65° F. for about 30 minutes with stirring reacts with the carbon dioxide and water to form an amount of soluble arsenic, expressed as metallic arsenic, not more than about 2% of the weight of the sample, and said resistance to the decomposing action of the carbon dioxide solution is such that a second representative sample weighing about 1.5 grams, when brought into intimate contact with about 2 grams of carbon dioxide dissolved in about 750 cc. of water at a temperature of about 65° F. for about 30 minutes with stirring reacts with the carbon dioxide and water to form an amount of soluble arsenic, expressed as metallic arsenic, not less than about ½% of the weight of the sample, substantially all of the particles of the pulverized calcium arsenite being between about ½ inch and about 1 inch in diameter.

3. In the method of making insecticidal calcium arsenate for controlling the normally occuring insect pests on relatively tender growing plants, the steps which comprise heating pulverized calcium arsenite in an atmosphere containing gaseous oxygen to a temperature sufficient to bring about the exothermal chemical reaction of the oxygen with the calcium arsenite to form calcium arsenate, maintaining the particles of the calcium arsenite during and after said reaction in intimate contact with a surrounding oxidizing atmosphere at a temperature between about 1100° F. and about 2200° F. by removal of a portion of the exothermal heat produced by said interaction until the resistance of the particles of the calcium arsenate thus formed toward the decomposing action of carbon dioxide solution or carbonic acid is such that a representative sample of the product thus obtained, weighing about 1½ grams, when brought into intimate contact with about ¼ gram of carbon dioxide dissolved in about 750 cc. of water at a temperature of about 65° F. for about 30 minutes with stirring reacts with the carbon dioxide and water to form an amount of soluble arsenic, expressed as metallic arsenic, not more than about 2% of the weight of the sample, and said resistance to the decomposing action of the carbon dioxide solution is such that a second representative sample weighing about 1.5 grams, when brought into intimate contact with about 2 grams of carbon dioxide dissolved in about 750 cc. of water at a temperature of about 65° F. for about 30 minutes with stirring reacts with the carbon dioxide and water to form an amount of soluble arsenic, expressed as metallic arsenic, not less than about ½% of the weight of the sample, substantially all of the particles of the pulverized calcium arsenite being between about ½ inch and about 1 inch in diameter and containing a proportion of arsenic trioxide not substantially in excess of the chemically equivalent proportion of calcium oxide.

4. In the method of making insecticidal calcium arsenate for controlling the normally occurring insect pests on relatively tender growing plants, the steps which comprise heating pulverized calcium arsenite in an atmosphere containing gaseous oxygen to a temperature sufficient to bring about the exothermal chemical reaction of the oxygen with the calcium arsenite to form calcium arsenate, maintaining the particles of the calcium arsenite during and after said reaction in intimate contact with a surrounding oxidizing atmosphere at a temperature between about 1100° F. and about 2200° F. by removal of a portion of the exothermal heat produced by said interaction until the resistance of the particles of the calcium arsenate thus formed toward the decomposing action of carbon dioxide solution or carbonic acid is such that a representative sample of the product thus obtained, weighing about 1½ grams, when brought into intimate contact with about ¼ gram of carbon dioxide dissolved in about 750 cc. of water at a temperature of about 65° F. for about 30 minutes with stirring reacts with the carbon dioxide and water to form an amount of soluble arsenic, expressed as metallic arsenic, not more than about 2% of the weight of the sample, and said resistance to the decomposing action of the carbon dioxide solution is such that a second representative sample weighing about 1.5 grams, when brought into intimate contact with about 2 grams of carbon dioxide dissolved in about 750 cc. of water at a temperature of about 65° F. for about 30 minutes with stirring reacts with the carbon dioxide and water to form an amount of soluble arsenic, expressed as metallic arsenic, not less than about ½% of the weight of the sample, substantially all of the particles of the pulverized calcium arsenate being between about ½ inch and about 1 inch in diameter and containing a proportion of arsenic trioxide not substantially in excess of the chemically equivalent proportion of calcium oxide, and the particles of the pulverized calcium arsenite having a substantially uniform composition throughout with respect to the ratio of arsenic trioxide to calcium oxide whereby loss of uncombined white arsenic is prevented during the oxidation of the calcium arsenite.

5. The method of making calcium arsenite adapted for conversion by oxidation to calcium arsenate which comprises intimately mixing arsenic trioxide with water containing less lime than that amount of lime which is chemically equivalent to the arsenic trioxide and subsequently intimately mixing the product thus obtained with an amount of lime which is not substantially less than the chemical equivalent of the chemically uncombined arsenic trioxide remaining in the mixture whereby a calcium arsenite of uniform composition is rapidly formed with a minimum amount of stirring of the ingredients.

6. In the method of making insecticidal calcium arsenate containing hydrated lime for controlling the normally occurring insect pests on relatively tender growing plants, the steps which comprise heating pulverized calcium arsenite containing excess hydrated lime in an atmosphere containing gaseous oxygen to a temperature sufficient to bring about an exothermal chemical reaction of the oxygen with the calcium arsenite to form calcium arsenate and quick lime, maintaining the particles of the calcium arsenite during and after said reaction in intimate contact with a surrounding oxidizing atmosphere at a temperature between about 1100° F. and about 2200° F. by removal of a portion of the exothermal heat produced by said interaction until the resistance of the particles of the calcium arsenate thus formed toward the decomposing action of carbon dioxide solution or carbonic acid is such that a representative sample of the product thus obtained, weighing about 1½ grams, when brought into intimate contact with about ¼ gram of carbon dioxide dissolved in about 750 cc. of water at a temperature of about 65° F. for about 30 minutes with stirring reacts with the carbon dioxide and water to form an amount of soluble arsenic, expressed as metallic arsenic, not more than about 2% of the weight of the sample, and said resistance to the decomposing action of the carbon dioxide solution is such that a second representative sample weighing about 1.5 grams, when brought into intimate contact with about 2 grams of carbon dioxide dissolved in about 750 cc. of water at a temperature of about 65° F. for about 30 minutes with stirring reacts with the carbon dioxide and water to form an amount of soluble arsenic, expressed as metallic arsenic, not less than about ½% of the weight of the sample, and then hydrating the quick lime to a sufficient extent to form substantially dry hydrated lime.

7. In the method of making insectcidal calcium arsenate for controlling the normally occurring insect pests on relatively tender growing plants, the steps which comprise heating pulverized calcium arsenite in an atmosphere containing gaseous oxygen to a temperature sufficient to bring about the exothermal chemical reaction of the oxygen with the calcium arsenite to form calcium arsenate, maintaining the particles of the calcium arsenite during and after said reaction in intimate contact with surrounding oxidizing atmosphere at a temperature between about 1500° F. and about 1800° F. for a period of time between about 10 minutes and about 8 hours, the time of heating varying inversely with the temperature in such manner that at a temperature of about 1500° F. the corresponding time of heating is between about 3 hours and about 8 hours and such that at a temperature between about 1600° F. and about 1700° F. the corresponding time of heating is about ½ hour and such that at a temperature of about 1800° F. the corresponding time of heating is between about 10 minutes and about 15 minutes and such that at temperatures intermediate between the specific temperatures stated above the corresponding times of heating are those corresponding to the times obtained by interpolation.

8. In the method of making insecticidal calcium arsenate adapted for use for controlling the normally occurring insect pests on relatively tender growing plants, the steps which comprise chemically interacting gaseous oxygen with pulverized calcium arsenite to form calcium arsenate, maintaining the calcium arsenite, during and after its oxidation, at a temperature between about 1100° F. and 2200° F. until a representative sample of the product thus obtained, weighing about 1½ grams, when brought into intimate contact with about ¼ gram of carbon dioxide dissolved in about 750 cc. of water at a temperature of about 65 degrees Fahrenheit for about 30 minutes with stirring reacts with the carbon dioxide and water to form an amount of soluble arsenic, expressed as metallic arsenic, not more than about 2 percent of the weight of the sample.

9. In the method of making insecticidal calcium arsenate adapted for use for controlling the normally occurring insect pests on relatively tender growing plants, the steps which comprise chemically interacting gaseous oxygen with pulverized calcium arsenite to form calcium arsenate, maintaining the particles of the calcium arsenite, during and after their oxidation at a temperature between about 1100° F. and 2200° F. by removal of a portion of the exothermal heat produced by said interaction until a representative sample of the product thus obtained, weighing about 1½ grams, when brought into intimate contact with about ¼ gram of carbon dioxide dissolved in about 750 cc. of water at a temperature of about 65° F. for about 30 minutes with stirring reacts with the carbon dioxide and water to form an amount of soluble arsenic, expressed as metallic arsenic, not more than about 2% of the weight of the sample, and discontinuing the heating before a second representative sample weighing about 1.5 grams, when brought into intimate contact with about 2 grams of carbon dioxide dissolved in about 750 cc. of water at temperature of about 65° F. for about 30 minutes with stirring reacts with the carbon dioxide and water to form an amount of soluble arsenic, expressed as metallic arsenic, less than about ½% of the weight of the sample.

JOHN F. LES VEAUX.